United States Patent [19]

Black

[11] 4,040,778
[45] Aug. 9, 1977

[54] BAKING PIT FURNACES

[75] Inventor: William Brown Black, Bridge of Weir, Scotland

[73] Assignee: Refractory Services International Limited, Glasgow, Scotland

[21] Appl. No.: 640,281

[22] Filed: Dec. 12, 1975

[30] Foreign Application Priority Data

Apr. 9, 1975 United Kingdom .............. 14482/75
June 4, 1975 United Kingdom .............. 24036/75

[51] Int. Cl.² ............................ F27B 5/02; F27B 5/16
[52] U.S. Cl. ....................................... 432/192; 432/3; 432/202; 432/247
[58] Field of Search .................... 432/3, 192, 202, 247

[56] References Cited

U.S. PATENT DOCUMENTS

| 1,383,378 | 7/1921 | Black | 432/3 |
|---|---|---|---|
| 2,813,708 | 11/1957 | Frey | 432/247 |
| 3,048,382 | 8/1962 | Mansfield | 432/3 |
| 3,448,971 | 6/1969 | Renkey | 432/247 |
| 3,656,721 | 4/1972 | Bauer | 432/247 |
| 3,672,649 | 6/1972 | Allen | 432/3 |
| 3,848,034 | 11/1974 | Schaefer | 432/3 |

Primary Examiner—John J. Camby
Attorney, Agent, or Firm—Mason, Fenwick & Lawrence

[57] ABSTRACT

Baking pit furnaces have flues cast in several interrelated parts in refractory concrete and which are assembled from the cast parts which are compacted during casting in mould means by inducing small vibrations at high frequency to the moulds in which they are cast; flues assembled from the cast parts preferably include baffles extending between side walls thereof midway of their lengths and means tying the side walls together over each length thereof defined between a control baffle and each of the two end walls of the flue. Central baffles may be rooted in the bottom walls of the flues, and all corners and free baggle edges are preferably rounded. Directional vanes are disclosed with the free baffle edges, each of said vanes being of arcuate cross-sectional shape and extending between the side walls of the flue spaced from the associated free baffle edge.

8 Claims, 45 Drawing Figures

BAKING PIT FURNACES

This invention relates to baking pit furnaces, and more especially to the flues of such furnaces and methods of constructing such flues.

Baking pit furnaces have been used for many years and are associated with the production of carbon and graphite articles. This use is particularly widespread in the aluminium smelting industry for the production of anodes.

In baking pit furnaces, banks of flues in end-to-end relation and banks of baking pits of similar length and also in end-to-end relation alternate side on to one another in a longitudinal series which is doubled back upon itself so that, during progression of burners along a closed loop from flue to flue, articles in baking pits flanking such burners are baked by indirect heat passing through the flue walls and can be removed and replaced by new batches of green articles before the burners have completed the cycle and again serve the flues associated with the re-charged baking pits. The object is to achieve continuous production and the flues play a vital role in the achievement of this object.

The basic unit used hitherto in the construction of flues in baking pit furnaces is a rectangular tongued and grooved brick. Construction of a flue is a time-consuming task and the time available for repair or replacement of a flue in a furnace in operation is manifestly at a premium if the production of baked articles is not to be interrupted.

Occasionally, moreover, head walls, i.e., the walls at the ends of the flues, require replacement, and this cannot normally be done without simultaneous replacement of perhaps 10 to 16 flue side walls.

The working life of a flue is adversely affected by differential temperatures therewithin and baffles have been provided in the flue with a view to directing the flow of combustion gases within the flue to improve the distribution of the flow and thus to minimize the range of temperatures within the flue, as the greater the range of temperatures the wider the range in the quality of the baked products, some of which may be overbaked and some underbaked, and the greater the potential damage to flue walls due to differential expansions of bricks. With a view to mitigating the potential damage to flue walls use has been made of tie bricks which extend between side walls of the flue and with the baffles serve to keep the side walls at a uniform spacing apart. Unfortunately, however, these ties are rectangular and present flat surfaces impeding the regular flow of combustion gases and to overcome these obstacles it has been necessary to increase the pressure at the burners. The effect of the large number of small rectangular ties has been to create a large number of small dead areas in the flue, and combined with the baffles the overall effect is to set up large areas of dead space where gas is virtually stagnant or is even contrary to the regular gas flow. This condition contributes to the wide range in temperatures to be found in flues known hitherto, and this in turn leads to underbaked and/or overbaked articles and damage to flue walls due to the higher temperatures and differential expansion caused by the range.

An object of the present invention is to obviate or mitigate the disadvantages hereinbefore set forth of flues in or for baking pit furnaces.

In accordance with the present invention, we provide a method of constructing a flue for a baking pit furnace comprising casting said flue in several interrelated parts in refractory concrete, and assembling the parts.

The casting of the parts is preferably effected in moulds to parts of which are induced small vibrations at high frequency to compact said concrete.

The assembling of the parts in situ in a baking pit furnace can be effected in less than four hours and, where plant conditions permit, possibly in as little as one hour.

Manifestly repair and replacement of individual flues can readily be effected in the time available prior to return of the burners to the relevant section of the furnace.

Also, according to the present invention we provide, in or for a baking pit furnace, a flue assembled from interrelated parts precast in refractory concrete and including a baffle extending between the side walls of the flue midway of the length of the flue and means tying the side walls together over each length thereof defined between said central baffle and each one of the two end walls of the flue.

The tying means may be ties of circular section or may be further baffles.

The central baffle may be rooted in the bottom wall of the flue and preferably all corners and free baffle edges are rounded. Preferably, also, directional vanes are associated with free baffle edges, such vanes being of arcuate cross-sectional shape and extending between the side walls of the flue at some spacing from the free baffle edges.

Embodiments of the present invention will now be described, by way of example, with reference to the accompanying drawings which include for comparison purposes illustrations of traditional flues used in baking pit furnaces, and in which:

FIGS. 16A to 16G are respectively, an elevation in the direction of arrow A in FIG. 16, a section on the line B—B in FIG. 16, a section on the line C—C in FIG. 16, a section on the line D—D in FIG. 16, a section on the line E—E in FIG. 16 and a plan view corresponding to FIG. 16.

Figure 1:
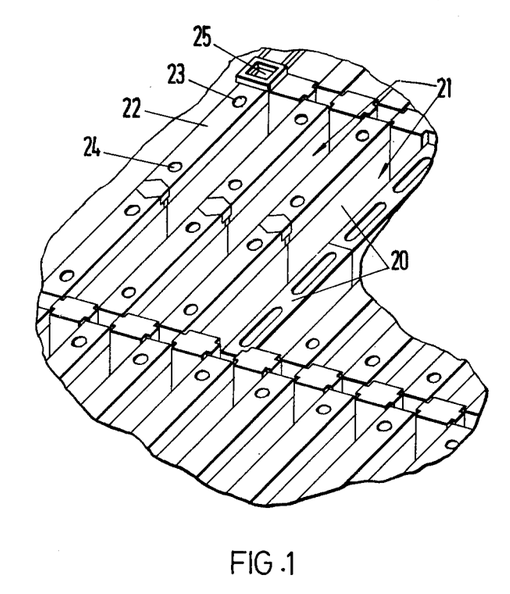
FIG. 1 is a perspective view, from above, of a portion of a baking pit furnace illustrating banks of flues in end-to-end relation alternating with banks of baking pits of similar length and also in end-to-end relation.
Figure 2:
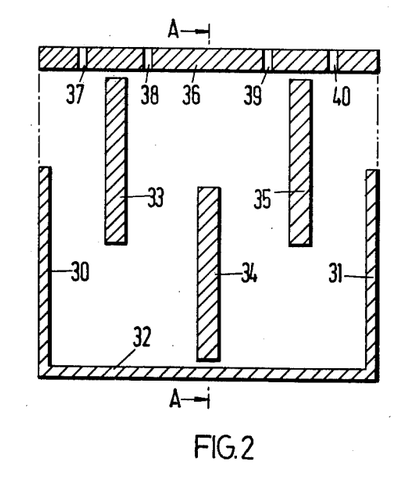
FIGS. 2 to 5 are somewhat diagrammatic longitudinal vertical sections through traditional flues of baking pit furnaces.
Figure 2A:
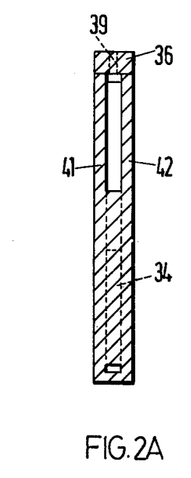
FIGS. 2A, 3A and 5A are sections on the lines A—A, B—B, and D—D of FIGS. 2, 3 and 5 respectively.
Figure 3:
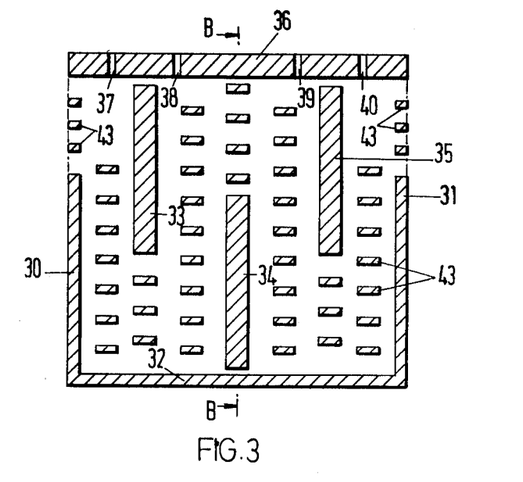
Figure 3A:
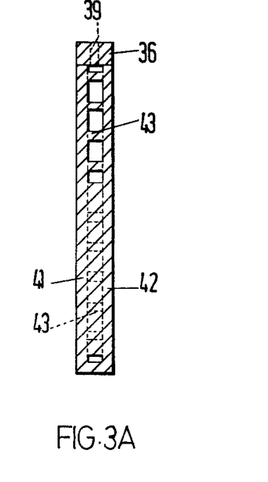

Referring now to the drawings, and firstly to FIG. 1 thereof, banks of flues 20 in end-to-end relation, and banks of baking pits 21 also in end-to-end relation, alternate side on to one another in a longitudinal series which is doubled back upon itself. One bank of flues 20 in FIG. 1 is shown without flue caps 22 in which are openings 23 and 24 through which the products of combustion from burners (not shown) issue into the flues. Waste gases are discharged through the duct 25.

Figure 4:
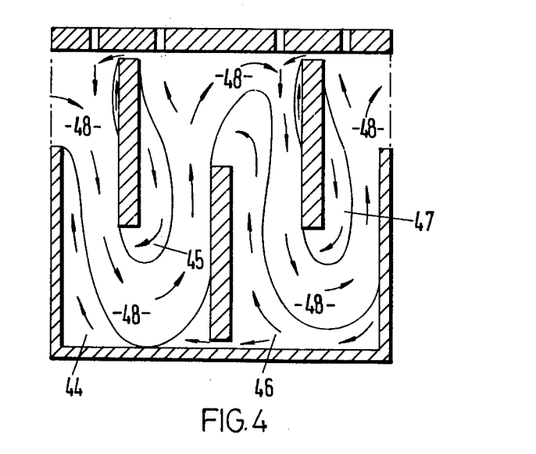

FIGS. 2 and 2A and 3 and 3A, illustrate flues which are typical of many installed throughout the carbon/graphite baking industries and which include end walls 30 and 31, a bottom wall 32, baffles 33, 34 and 35 and a cap 36 in which are openings 37, 38, 39 and 40 through which the products of comubustion from burners can issue into the flues, the openings 38 and 40 being secondary and utilized only if required. The flue is contructed from tongued and grooved bricks and the construction work is a time-consuming task. Time is at a premium for replacement or repair work and quality of construction may suffer as a result. The baffles 33, 34 and 35 are intended to direct the hot products of combustion to all parts of the flue. They also act to retain the flue integrity by keeping the side walls 41 and 42 at the same distance apart. The flue shown in FIGS. 3 and 3A differs from that shown in FIGS. 2 and 2A in that tie bricks bridge between the side walls 41 and 42 and assist in maintaining the flue integrity. The ties 43 are rectangular and present flat surfaces against the regular gas flow and to overcome this effect it is necessary to increase the pressure at the burners. The number and location of the ties 43 varies with the size and design of the flue and the effect of a large number of small rectangular ties 43 on the flow is to set up a large number of small dead areas. In combination with the baffles 33, 34 and 35, the overall effect of this is to set up large areas 44, 45, 46, and 47 of dead space where gas flow is virtually stagnant or is contrary to the main stream 48 as indicated in FIG. 4. This condition contributes to the wide temperature range to be found in traditional flues, and this in turn could lead to underbaked and/or overbaked anodes which may need to be scrapped. Flue walls can also be damaged due to the higher temperatures and differential expansion caused by the temperature range.

Figure 5:
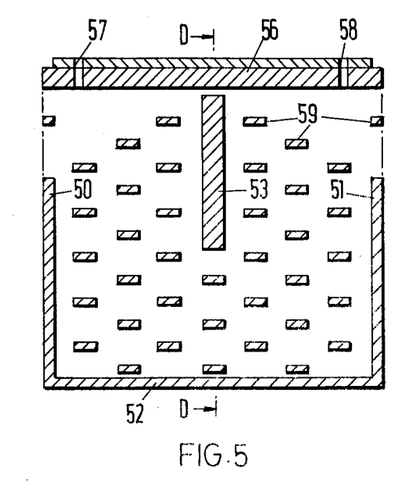
Figure 5A:
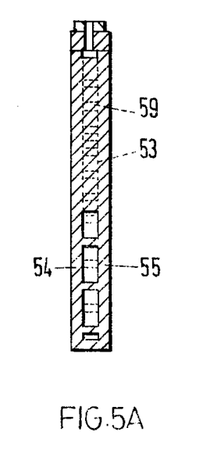

FIGS. 5 and 5A illustrate a single pass flue typical of many installed throughout the carbon/graphite baking industries. The flue includes end walls 50 and 51, a bottom wall 52, a single baffle 53 which is positioned centrally of the length of the flue and bridges between the side walls 54 and 55 of the flue, and a cap 56 in which are openings 57 and 58 through which the products of combustion from burners can issue into the flue. This flue is also constructed from tongued and grooved bricks. As there is only one baffle 53 to direct the products of combustion to all parts of the flue, it is situated with its upper end close to the top of the flue. Tie bricks 59 bridge between the side walls 54 and 55 and assist in maintaining the flue integrity by keeping the outer walls at the same distance apart. The flue of FIGS. 5 and 5A suffers from the same disadvantages already pointed out in connection with the flues of FIGS. 2 and 2A, and FIGS. 3 and 3A.

Figure 6:
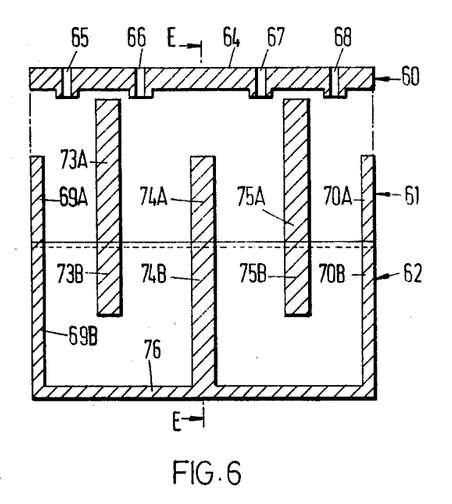
FIGS. 6 to 13 are somewhat diagrammatic longitudinal vertical sections through flues according to the invention, of baking pit furnaces.
Figures 6A, 7:
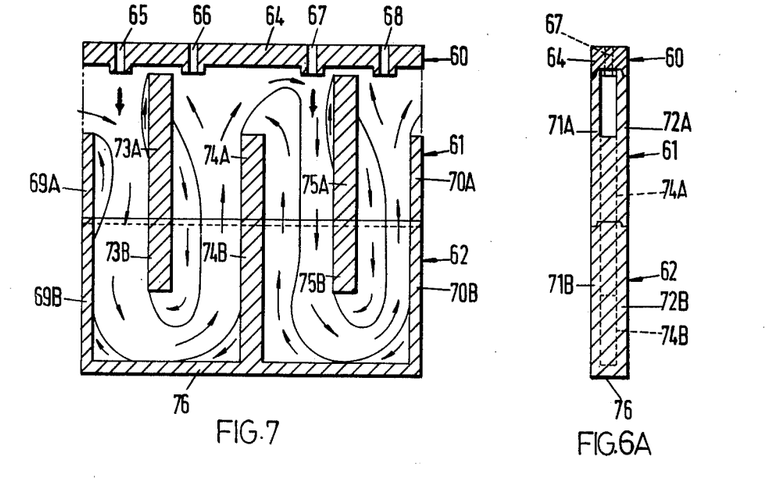
FIGS. 6A, 8A, 9A, 10A, 11A, 12A and 13A are sections on the lines E—E, G—G, H—H, J—J, K—K, L—L and M—M of FIGS. 6 and 8 to 13, respectively.

FIGS. 6, 6A and 7 illustrate a flue according to the present invention. The flue comprises three arts 60, 61 and 62 individually cast in refractory concrete, the concrete mix being subjected during casting to small vibrations at high frequency to compact same. The part 60 comprises a flue cap 64 with openings 65, 66, 67 and 68 for introduction into the flue of combustion products from the burners; the part 61 includes upper portions 69A and 70A of end walls, upper portions 71 and 72A of side walls, and upper portions 73A, 74A and 75A of three baffles — and the part 62 includes a bottom wall 76, lower portions 69B and 70B of the end walls, lower portions 71B and 72B of the side walls, and lower portions 73B 74B and 75B of the baffles. The individual parts 60, 61 and 62 fit together and the flue can be erected in less than 4 hours and, where plant conditions permit, possibly in at most 1 hour. It will be noted that, in comparison with the typical flues illustrated in FIGS. 2 and 2A, and FIGS. 3 and 3A the baffles are much deeper and the central baffle 74A, 74B is rooted in the bottom wall 76 of the flue. This baffle arrangement assists the flow of combustion gases. The flow pattern in use of the flue is illustrated in FIG. 7 by the relatively thin arrows, the relatively thick arrows indicating the entry of the products of combustion into the flue.

Figure 8:
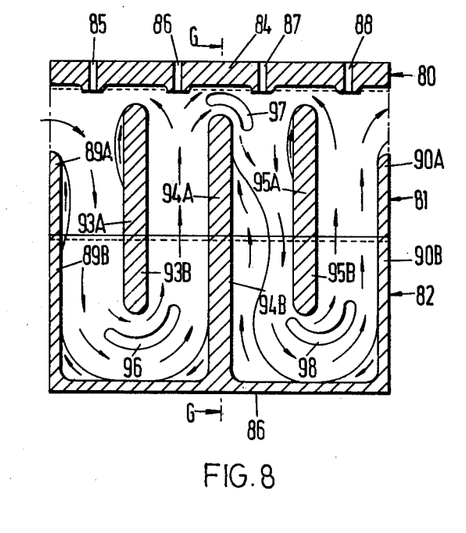
Figure 8A:
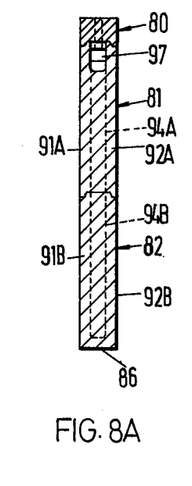

FIGS. 8 and 8A illustrate a further flue according to the invention, and this shows further improvements in the combustion gas flow due to the rounding off of the edges of the baffles, the repositioning of the baffles between the central baffle and the end walls so that the flue duct widths are equal, and the inclusion of directional vanes which are of arcuate cross-section and extend between the side walls of the flue all with a view to improving the distribution of the combustion gases within the flue. As in the embodiment just described with reference to FIGS. 6, 6A and 7, the flue of FIGS. 8 and 8A comprises three interfitting parts, here denoted 80, 81 and 82 individually cast in refractory concrete, the concrete mix being subjected during casting to small vibrations at high frequency to compact same during casting. The part 80 comprises a flue cap 84 with openings 85, 86, 87 and 88 for introduction into the flue of combustion products from the burners; the part 81 includes upper portions 89A and 90A of end walls, upper portions 91A and 92A of side walls, and upper portions 93A, 94A and 95A of three baffles; and the part 82 includes a bottom wall 86, lower portions 89B and 90B of the end walls, lower portion 91B and 92B of the side walls, and lower portions 93B, 94B and 95B of the baffles. As can be seen in FIG. 8, the baffles are rounded at their ends and the central baffle 94A, 94B is radiused at its root where merging with the bottom wall 86. Arcuate directional vanes 96, 97, and 98 which extend between the side walls 91A, 91B and 92A, 92B of the flue, are located near the downstream ends of the baffles 93A, 93B; 94A, 94B; and 95A, 95B, respectively with a view to improving the distribution of the combustion gases within the flue, the flow of the gases being indicated by the arrows in FIG. 8.

Figure 9:
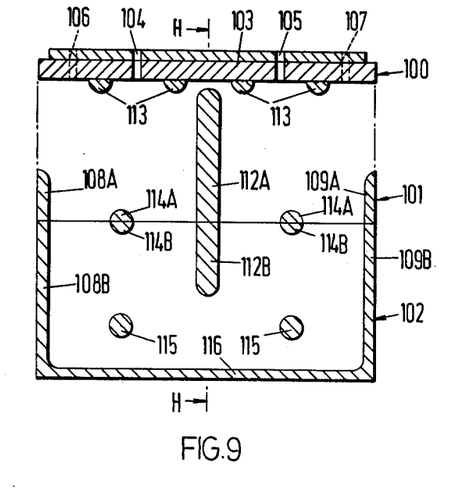
Figure 9A:
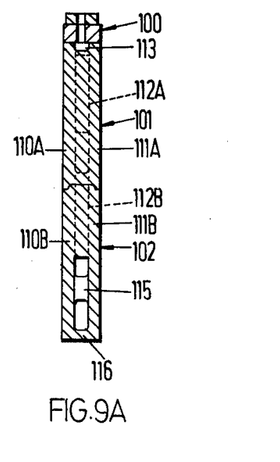

FIGS. 9 and 9A illustrate a single-pass flue in accordance with the present invention. The flue comprises three interfitting parts 100, 101 and 102, individually cast in refractory concrete with the concrete mix subject to small vibrations at high frequency to compact same during casting. The part 100 comprises a flue cap 103 with openings 104 and 105, and possibly, alternative openings 106 and 107 for introduction into the flue of combustion products from the burners; the part 101 includes upper portions 108A and 109A of end walls, upper portions 110A and 111A of side walls, the upper portion 112A of a baffle with rounded ends, upper ties 113 of segmental section whereof the flat surfaces are co-planar and provide a seating for the flue cap 103, and upper portions 114A of intermediate ties of circular cross-section; the part 102 includes a bottom wall 116, lower portions 108B and 109B of the end walls, lower portions 110B and 111B of the side walls, the lower portions 112B of the baffle the lower portions 114B of the intermediate ties and lower ties 115 of circular cross-section. The ties 113, 114A, 114B and 115 bridge between the side walls 108A, 108B and 109A, 109B, and are necessary for the mechanical strength of the flue but the rounded surfaces thereof allow freer passage of gases than do the flat surfaces of rectangular-section ties. Circular section ties are viable only with concrete flues.

Figure 10:
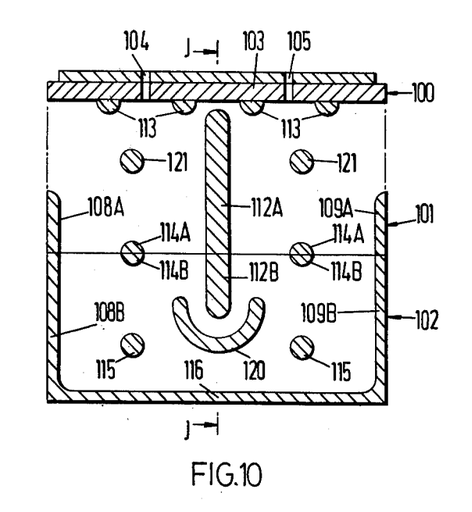
Figure 10A:
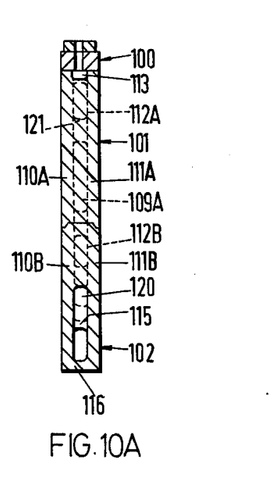

FIGS. 10, 10A; 11, 11A; 12, 12A; and 13, 13A illustrate single-pass flues which are modifications of the flue shown in FIGS. 9 and 9A, and, to avoid repetition of description, parts already identified in FIGS. 9 and 9A are similarly denoted in FIGS. 10, 10A; 11, 11A; 12, 12A; and 13, 13A and the specific description of each flue is concerned with the appropriate modification. All four modifications are concerned with improving the distribution of the combustion gases in the flue.

Referring specifically to FIGS. 10 and 10A, a directional vane 120 of arcuate cross-section extends between the side walls 110A, 110B and 111A, 111B of the flue and is spaced below the baffle 112A, 112B, the geometric centre of the vane 120 being in the longitudinal medium plane of the baffle and the concavity of the vane facing the baffle. Two additional ties 121, briding between the upper portions 110A and 111A of the side walls, serve to counterbalance the vane 120 as regards the mechanical strength of the flue.

Figure 11:
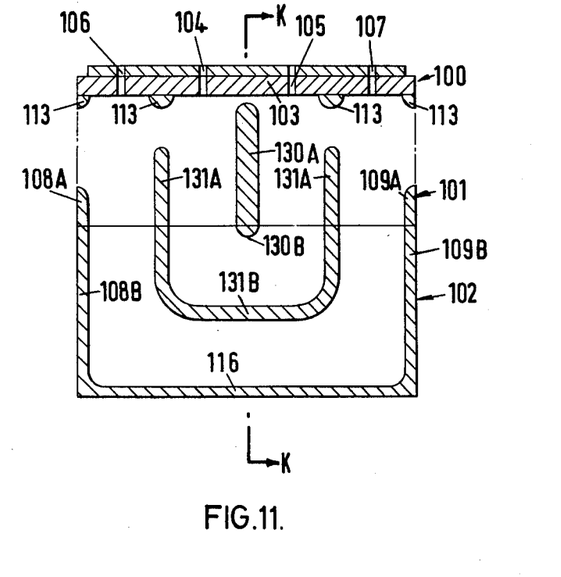
Figure 11A:
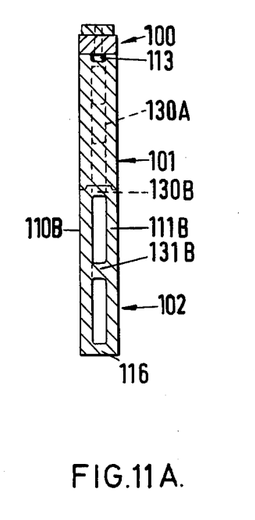

In FIGS. 11 and 11A there is a central baffle 130A, 130B substantially less deep than the baffle 112A, 112B in the embodiment of FIGS. 10 and 10A and the vane 120 in the latter embodiment is replaced by a deflecting baffle 131A, 131B of channel section with rounded corners which is symmetrical with respect to the central baffle 130A, 130B and renders superfluous the ties required in the FIGS. 10 and 10A arrangement. In FIG. 10 the flue is converted to a duplex arrangement and would be fired through ports 1 and 2.

Figure 12:
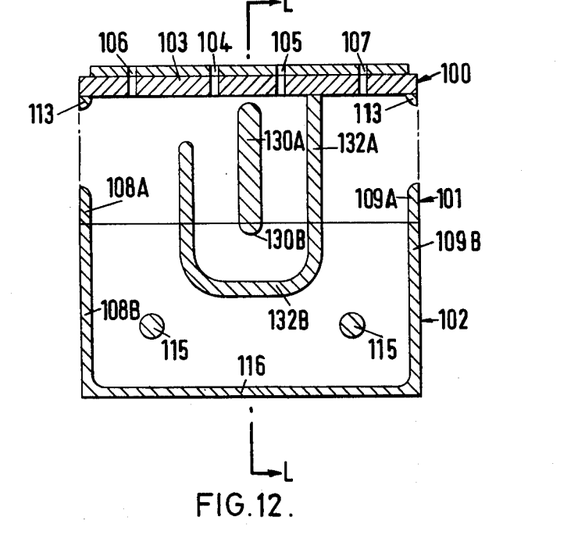
Figure 12A:
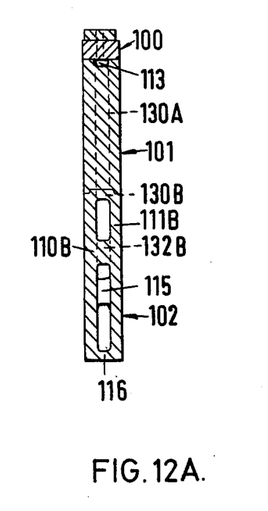

The FIGS. 12 and 12A arrangement differs from that of FIGS. 11 and 11A in that one limb of the channel-section baffle 132A, 132B is extended upwardly to abut the underside of the flue cap 103 when same is in position. Two ties 115 of circular section are included and in this case firing would be through ports 105 and 106.

Figure 13:
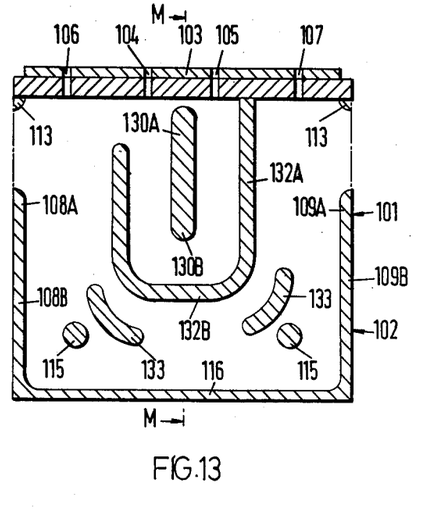
Figure 13A:
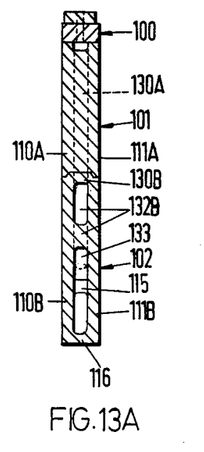

The FIGS. 13 and 13A arrangement differs from that of FIGS. 12 and 12A in that the two ties 115 are somewhat nearer the head or end walls 108A, 108B and 109A, 109B of the flue and arcuate vanes 133 extending between the side walls of the flue are interposed between the ties 115 and the rounded corners of the channel-section baffle 132A, 132B with the concavities of the vanes 133 facing said corners. As in the FIGS. 12 and 12A arrangement, firing would be through ports 105 and 106.

Figure 14:
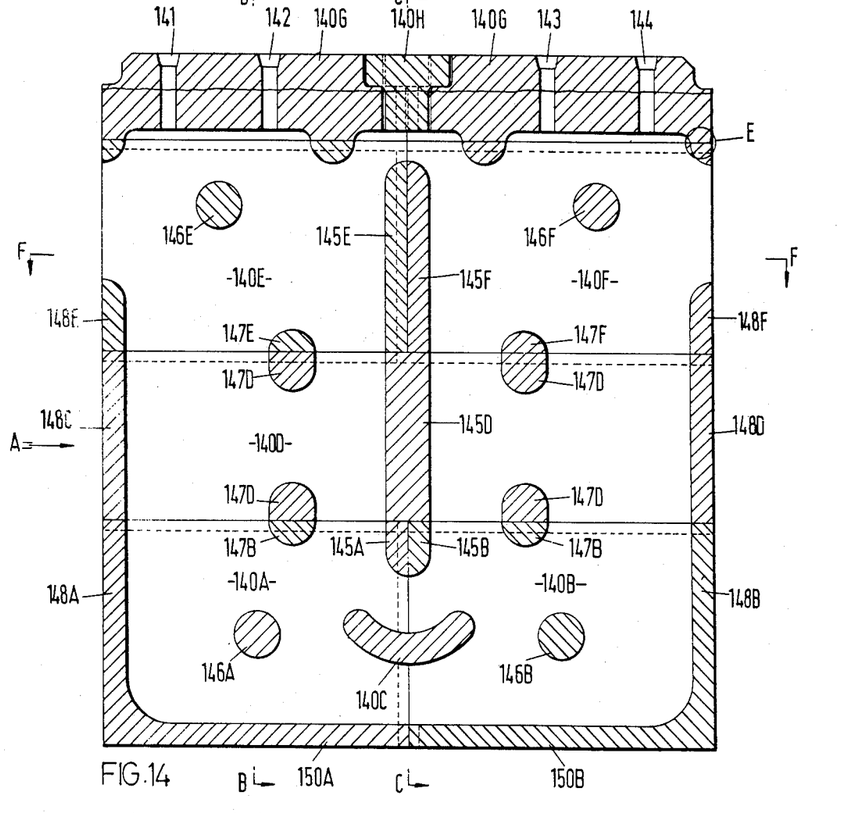
FIGS. 14, 15 and 16 are longitudinal vertical sections through flues according to the invention, of baking pit furnaces, these three Figures with the Figures associated therewith and to be hereinafter designated, specifically illustrating the inter-relationships of cast parts making up the flues.
Figure 14A:
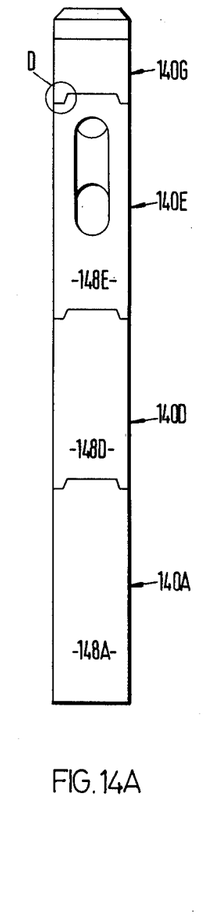
FIGS. 14A to 14G are, respectively, an elevation in the direction of arrow A in FIG. 14, a section on the line B—B in FIG. 14, a section on the line C—C in FIG. 14, a view of the detail at D in FIG. 14A, a view of the detail at E in FIG. 14, a section on the line F—F in FIG. 14, and a plan view corresponding to FIG. 14.
Figure 14B:
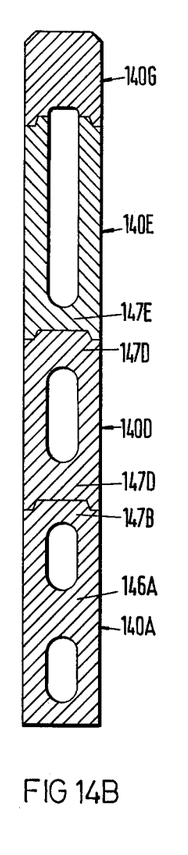
Figure 14C:
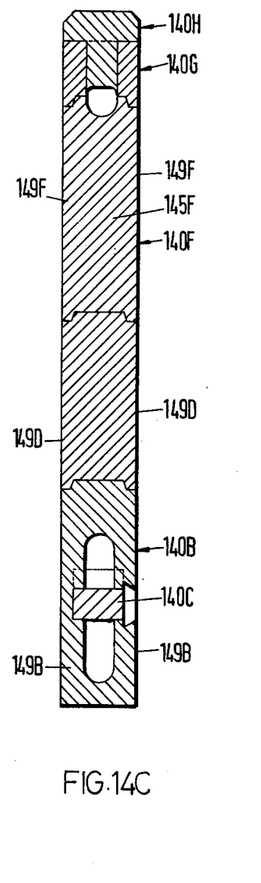
Figure 14D:
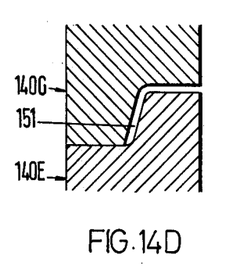
Figure 14E:
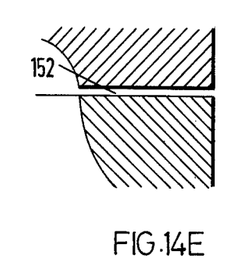
Figure 14F:
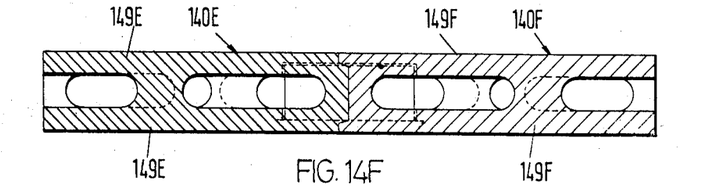
Figure 14G:
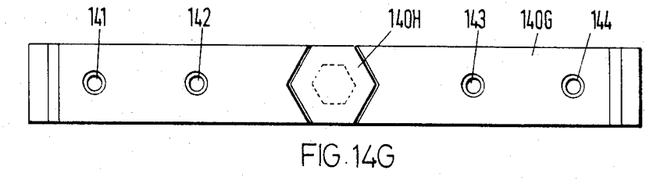

Referring now to FIGS. 14 and 14G, the flue is of eight interrelated parts 140A-140H. The part 140G is the cap in which are parts 141-144 through selected ones of which products of combustion are introduced into the flue from the burners. The part 140H is a plug with hexagonal head and stem (see FIG. 14G) which allows manufacture of the cap 140G in two identical parts and locks these parts together. Various members of the flue have portions thereof in two or more of the remaining six parts of the flue and where this is the case the portions of such members have the appropriate suffix letter added thereto. The same applies to members individual to the parts of the flue. The single baffle 145 has portions thereof integral with five different parts of the flue. There are four circular section ties 146A, 146B, 146E and 146F individual to parts of the flue and four ties 147 of oblate spheroidal section each having portions thereof integral with two different parts of the flue. The elongation in one direction of the ties 147 is to provide sufficient depth for tapped holes to take eyebolts for lifting purposes. The end walls, side walls and bottom wall of the flue are denoted 148, 149 and 150, respectively. The joints between the various parts of the flue are lapped, and the details at D (FIG. 14A) and E (FIG. 14) are shown in FIGS. 14D and FIG. 14E, respectively. The clearances 151 and 152 shown in FIGS. 14D and 14E, respectively, are for the purpose of avoiding shock loading. Horizontal clearances are filled with a refractory cement mix but vertical or vertically inclined clearances can be left dry. The side walls 149 in parts 140A and 140B have in their inner faces arcuate recesses which receive the ends of the arcuate vane making up the part 140C, one of the recesses merging with a slot 153 (see FIG. 14C) through the pertaining side wall, which slot enables location of the vane 140C from the exterior and is thereafter filled with a refractory cement mix.

Figure 15:
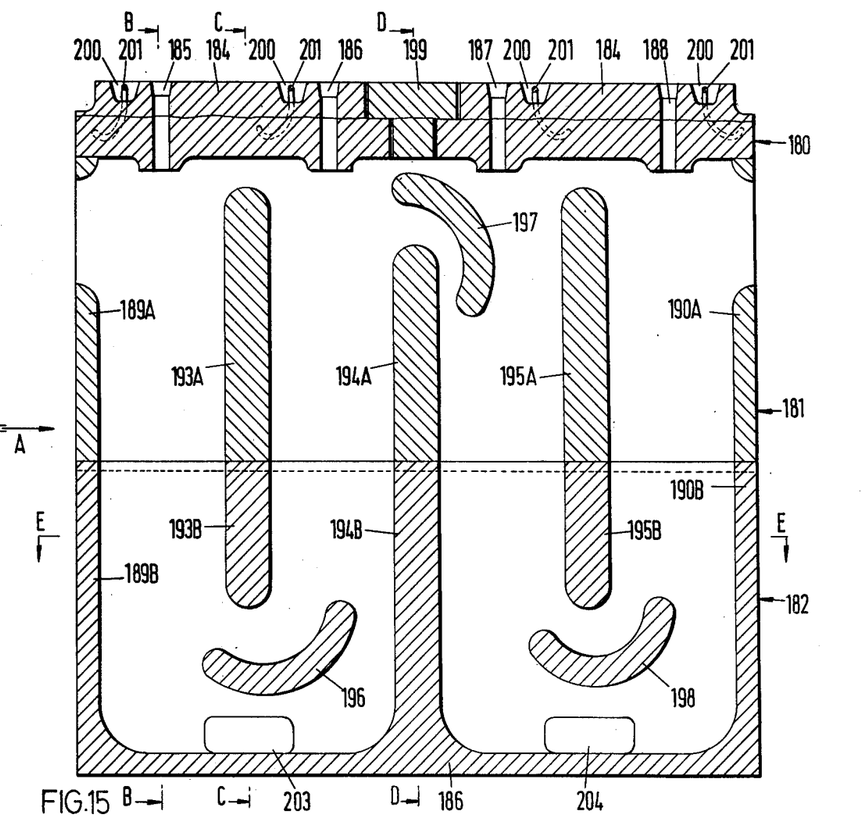
Figures 15A, 15B, 15C, 15D:
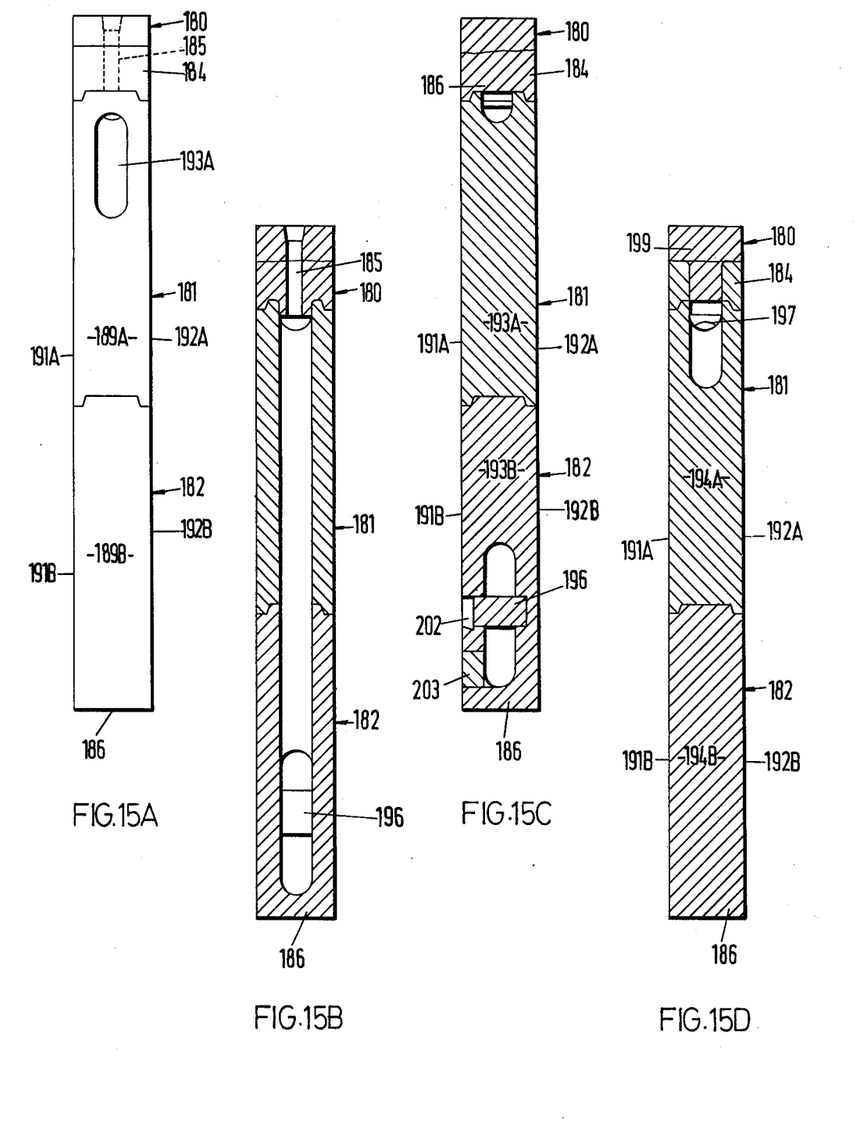
FIGS. 15A to 15F are, respectively, an elevation in the direction of arrow A in FIG. 15, a section on the line B—B in FIG. 15, a section on the line C—C in FIG. 15, a section on the line D—D in FIG. 15, a section on the line E—E in FIG. 15, and a plan view corresponding to FIG. 15.
Figure 15E:
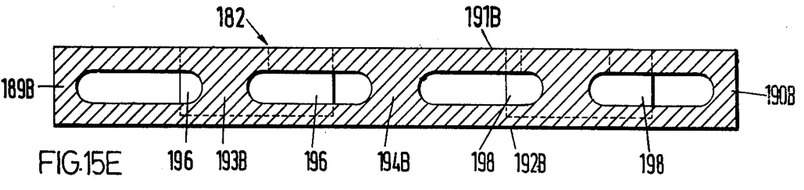
Figure 15F:
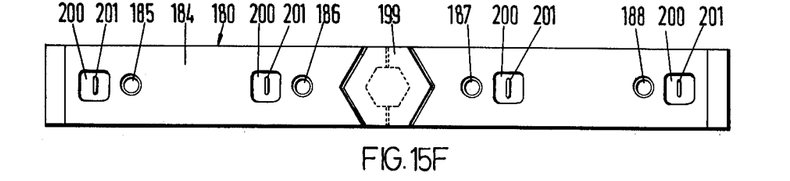

Whereas the flue shown in FIGS. 14 to 14G is a single-pass flue resembling that diagrammatically shown in FIGS. 10 and 10A, the flue shown in FIGS. 15 to 15F is akin to that diagrammatically shown in FIGS. 8 and 8A, and, to avoid duplication of description, the parts in FIGS. 15 to 15F already identified with reference to FIGS. 8 and 8A, are similarly identified but increased by one hundred.

As in the FIGS. 14 to 14G embodiment, the cap 184 has associated therewith a plug, here denoted 199, but additionally has in its upper surface four recesses 200 in which are straps 201 providing lifting points for mechanical handling of the part 180. The vanes 196, 197 and 198 are fixed in position in the same manner as described with reference to FIG. 14C, the cement mix filling of the slot in the side wall 191B being denoted 202 in FIG. 15C. There are also shown plugs 203 and 204 fitting into holes therefor in the side wall 191B adjacent the bottom wall 186, one hole being provided on each side of the central baffle 194A, 194B to allow cleaning out of the bottom of the flue by a vacuum pipe.

Figure 16:
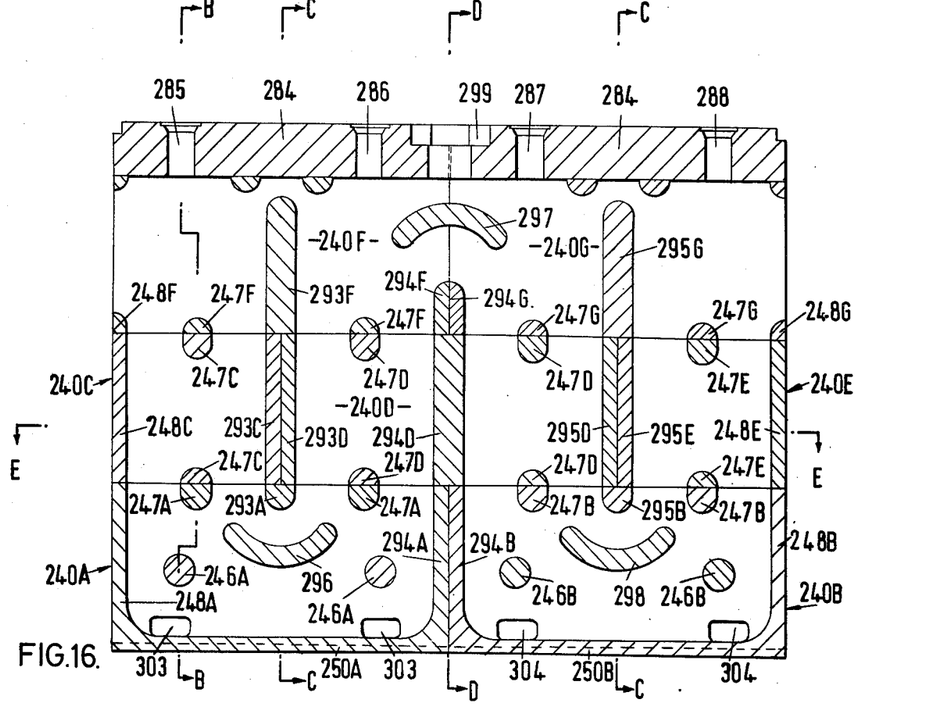
Figure 16A:
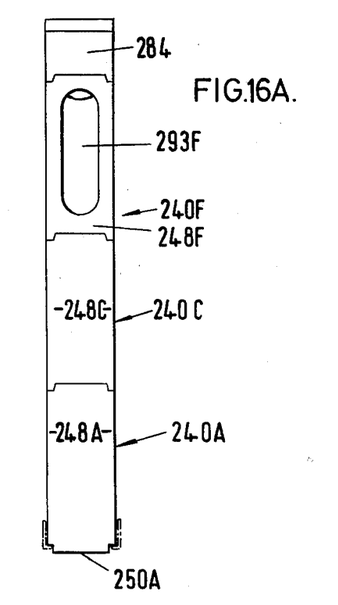
Figure 16B:
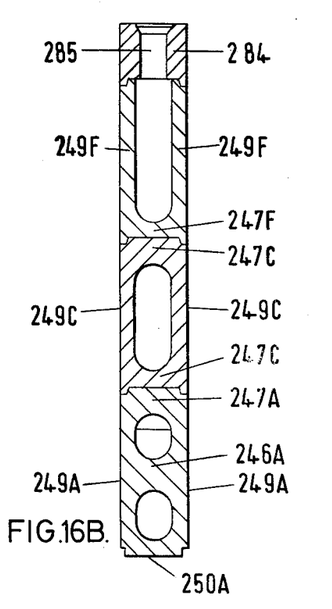
Figure 16C:
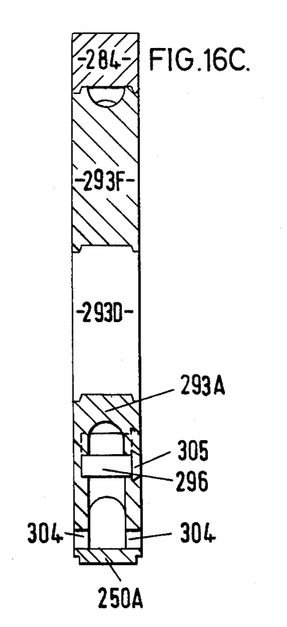
Figure 16D:
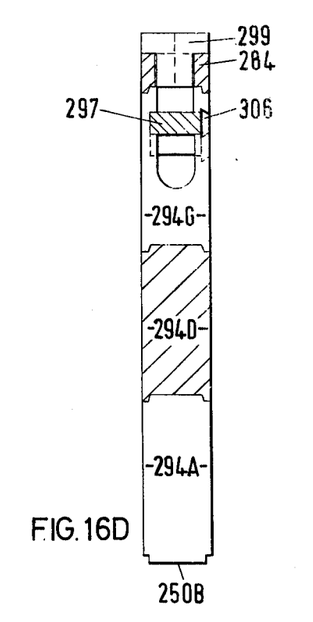
Figure 16E:
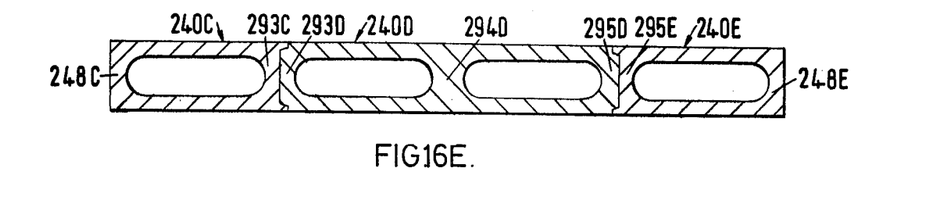
Figure 16F:
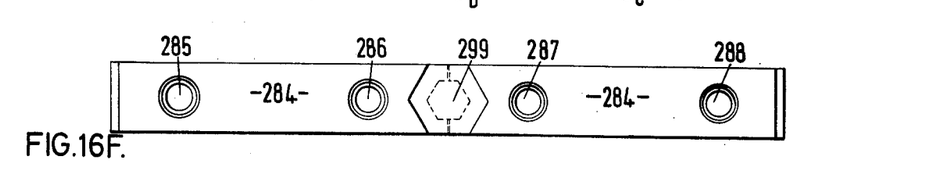

The embodiment of the invention shown in FIGS. 16 to 16F to some extent combines features of the embodiments of FIGS. 14 to 14G and FIGS. 15 to 15F, and again to avoid repetition of description members already described in the latter two embodiments are denoted by the same reference numerals increased by one hundred. The flue shown in FIGS. 16 to 16F comprises eight major parts 240A to 240H, three vanes 296, 297 and 298, a plug 299 associated with the cap 284 and four plugs 303 and 304 fitted in holes therefor in each of the side walls 249 in the portions of the latter which are integral features of the parts 240A and 240B. The slot in the lower side wall section 249A to be filled with a cement mix after the vane 296 is in position, is denoted 305 in FIG. 16C and that associated with the vane 297 is denoted 306 in FIG. 16D. As before all parts, both major and subsidiary, are cast in refractory concrete which is subjected to small vibrations at high frequency during casting to compact same.

In all cases, the arcuate vanes can be situated symmetrically in the flue to facilitate reversal of the firing pattern, or, as shown in FIG. 8 for example, in an offset position to obtain the greatest advantage when firing is contemplated only in one direction.

It will be manifest that the arrangements of interfitting parts in the embodiments of the invention which have been illustrated and described are purely exemplary.

Having set forth the nature of this invention, what is claimed herein is:

1. A baking pit furnace flue formed of interconnected precast refractory concrete parts including two side walls, two end walls, a bottom wall, a cap, a central baffle extending between said side walls substantially midway between said end walls of said flue, and tying means for said side walls together over each length thereof positioned between said central baffle and each one of said two end walls of said flue.

2. A flue as claimed in claim 1, in which said tying means comprises ties of circular section.

3. A flue as claimed in claim 1, in which said tying means comprises further baffles.

4. A flue as claimed in claim 1, in which said central baffle is rooted in said bottom wall.

5. A flue as claimed in claim 2, in which said central baffle is rooted in said bottom wall.

6. A flue as claimed in claim 3, in which said central baffle is rooted in said bottom wall.

7. A flue as claimed in claim 6, in which all corners and free baffle edges are rounded.

8. A flue as claimed in claim 7, additionally including a directional vane associated with and adjacent each free baffle edge, each said directional vane being of arcuate cross-sectional shape and extending between said side walls of said flue at the same spacing from their associated free baffle edge.

* * * * *